(No Model.)

R. L. PHELPS.
GRAIN CUTTING MACHINE.

No. 287,463.  Patented Oct. 30, 1883.

UNITED STATES PATENT OFFICE.

RODNEY L. PHELPS, OF RAVENNA, OHIO.

GRAIN-CUTTING MACHINE.

SPECIFICATION forming part of Letters Patent No. 287,463, dated October 30, 1883.

Application filed May 28, 1883. (No model.)

*To all whom it may concern:*

Be it known that I, RODNEY L. PHELPS, of Ravenna, Portage county, Ohio, have invented a new and useful Improvement in Grain-Cutting Machines, of which the following is a specification.

My invention relates to the use of chisel-edged cutters in pairs, each pair being beveled on the outer sides, and placed beyond and in line with a slot in the hopper, through which the grain is fed to a roller, grooved lengthwise and annularly, that carries the grain to the cutters.

The object of the invention is to prevent making fine meal, resulting from crowding the particles between the cutters.

Figure 1:
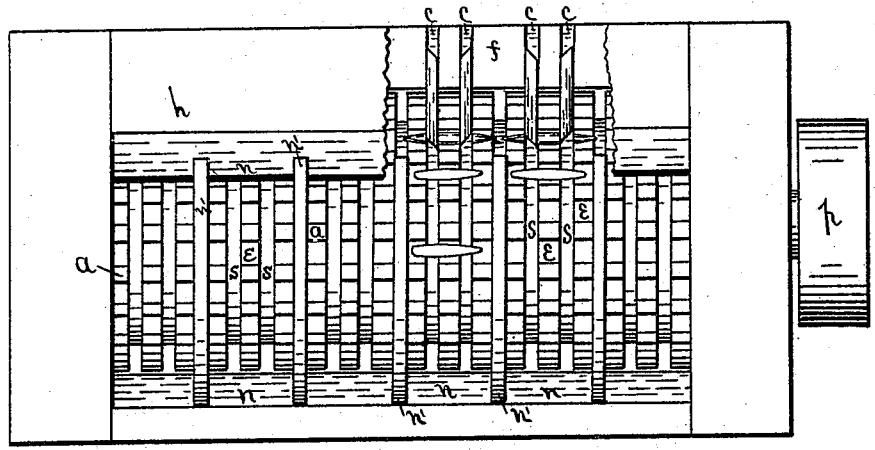
Figure 2:
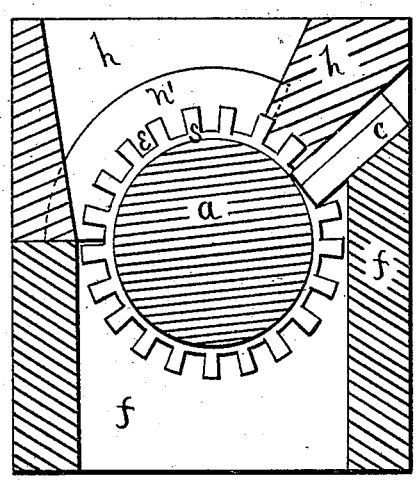

In the drawings forming a part of this specification, Figure 1 is a plan, with a part of the hopper broken away to show the relative positions of the hopper-slots and pairs of cutters. Fig. 2 is a section.

Roller $a$ is formed with longitudinal grooves $e$ and annular grooves $s$, the latter being of a suitable distance apart to make the particles of meal of a desired length. It is supported by a suitable frame, $f$, and is rotated by means of pulley $p$.

Guides $n'$ are inserted in the bottom of hopper $h$, and form slots $n$, of a suitable width to permit of but one kernel of oats or other grain to enter and lie lengthwise in each groove $e$ at the bottom of the slot. There are two annular grooves $s$ at the bottom of each slot $n$, and in these two grooves are placed a pair of cutters, $c\ c$, held in frame $f$, which is slotted to receive them. The pair of cutters $c\ c$ are situated beyond guides $n'$, and are beveled on the outside back from the edge, in order that in severing the kernel the part passing between the two cutters may not be crushed, and that the two ends of the kernel may have room in groove $e$ to be moved laterally by the beveled sides of the cutters without being crushed. The rotating roller $a$ carries the severed particles until they are discharged by gravity from the under side of the roller.

Guides $n'$ may be made to extend down only to the circumference of roller $a$, instead of entering the annular grooves $s$, and the grain-carrier $a$ may be in the form of an endless chain, if desired; but the roller form is deemed preferable.

I claim as my invention—

In a grain-cutting machine, a carrier formed with longitudinal grooves $e$ and cross-grooves $s$, in combination with a hopper, $h$, formed with slots $n$ and chisel-edged cutters $c\ c$, in pairs, each pair being beveled on the outer sides, and inserted in grooves $s$, beyond and in line with the hopper-slots $n$, substantially as described.

RODNEY L. PHELPS.

Witnesses:
BRADFORD HOWLAND,
GEO. F. ROBINSON.